United States Patent
Alton et al.

(10) Patent No.: US 9,746,739 B2
(45) Date of Patent: Aug. 29, 2017

(54) SEE-THROUGH DIMMING PANEL

(71) Applicant: MICROSOFT TECHNOLOGY LICENSING, LLC, Redmond, WA (US)

(72) Inventors: Daniel James Alton, Bellevue, WA (US); Nathan Ackerman, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 611 days.

(21) Appl. No.: 14/296,864

(22) Filed: Jun. 5, 2014

(65) Prior Publication Data

US 2015/0355521 A1    Dec. 10, 2015

(51) Int. Cl.
     *G02F 1/167*      (2006.01)
     *G02F 1/133*      (2006.01)
     (Continued)

(52) U.S. Cl.
     CPC .......... *G02F 1/167* (2013.01); *G01J 1/4204* (2013.01); *G02B 27/0101* (2013.01);
     (Continued)

(58) Field of Classification Search
     CPC ................................. G02F 1/167; G02F 1/172
     (Continued)

(56) References Cited

U.S. PATENT DOCUMENTS

| | | |
|---|---|---|
| 7,970,172 B1 | 6/2011 | Hendrickson |
| 8,098,421 B2 | 1/2012 | Moskowitz |

(Continued)

FOREIGN PATENT DOCUMENTS

WO      2013123592 A1      8/2013

OTHER PUBLICATIONS

International Search Report and Written Opinion dated Aug. 4, 2015, in PCT Patent Application No. PCT/US2015/033871, 11 Pages.

(Continued)

*Primary Examiner* — Scott J Sugarman
*Assistant Examiner* — Kristina Deherrera
(74) *Attorney, Agent, or Firm* — Vierra Magen Marcus LLP

(57) ABSTRACT

A see-through dimming panel includes first and second transparent substrate layers and suspended-particle-device (SPD) layer therebetween. A first transparent conductor layer is between the first transparent substrate layer and the SPD layer, and a second transparent conductor layer is between the second transparent substrate layer and the SPD layer. A first electrode is electrically coupled to the first transparent conductor layer. Second and third electrodes are electrically coupled to opposite ends of the second transparent conductor layer. An electric potential difference applied between the first and second electrodes controls a transmittance level of the SPD layer. An electric potential difference applied between the second and third electrodes, which results in a transverse electric field, controls a speed at which the transmittance level of the SPD layer decreases when the electric potential difference applied between the first and second electrodes controls is decreased.

20 Claims, 8 Drawing Sheets

(51) Int. Cl.
- *G02B 27/01* (2006.01)
- *G01J 1/42* (2006.01)
- *G02F 1/17* (2006.01)

(52) U.S. Cl.
CPC ..... *G02B 27/0172* (2013.01); *G02F 1/13306* (2013.01); *G02F 1/172* (2013.01); *G02B 2027/0118* (2013.01)

(58) Field of Classification Search
USPC ........ 359/296, 585, 253–254, 245, 290–291, 359/298; 250/214 AL; 351/159.39; 349/33; 345/49, 105, 107; 430/31–32
See application file for complete search history.

(56) References Cited

U.S. PATENT DOCUMENTS

| | | |
|---|---|---|
| 8,472,120 B2 | 6/2013 | Border et al. |
| 8,482,859 B2 | 7/2013 | Border et al. |
| 2006/0290651 A1 | 12/2006 | Verhaegh et al. |
| 2009/0195717 A1 | 8/2009 | Kabe et al. |
| 2009/0262085 A1 | 10/2009 | Wassingbo et al. |
| 2010/0026795 A1 | 2/2010 | Moller et al. |
| 2012/0162186 A1* | 6/2012 | Kim .................. G02F 1/167 345/212 |
| 2012/0235756 A1 | 9/2012 | Nishida |
| 2013/0201549 A1 | 8/2013 | Mori et al. |
| 2013/0250392 A1 | 9/2013 | Lam et al. |

OTHER PUBLICATIONS

Cohen, et al., "New Breakthrough Design for VOAs Based on Electro-optic Materials", In Proceedings of Lightwave, Jan. 1, 2000, 3 pages.

"SmartGlass Ireland Brings Switchable Glass Technology to Ireland", Published on: Apr. 5, 2005, Available at: http://www.siliconinvestor.com/readmsgs.aspx?subjectid=7837&msgnum=6093&batchsize=10&batchtype=Previous.

Alton, et al., "Composite Light Attenuator Device", U.S. Appl. No. 14/271,139, filed May 6, 2014.

* cited by examiner

SEE-THROUGH DIMMING PANEL

BACKGROUND

Recently, there has been an increased interest in switchable glass, also known as smart glass. Switchable glass alters its light transmissive characteristics upon application of an appropriate voltage. For example, applying an electric potential difference (also referred to as a voltage) between two spaced apart parallel layers of a smart glass panel may cause the glass to switch from dark or opaque to transparent or translucent. Smart glass has been used, e.g., to provide "privacy windows" to adjust the privacy of homes and other buildings, or portions of them, such as changing or bathing rooms, showers, and the like. Similar concepts have been used to increase the energy efficiency of windows. For example, in the summer, smart glass may be used to reduce the amount of sunlight transmitted into a home or office building at midday, thereby reducing the workload on the air conditioning system required to keep the building cool.

Several smart glass technologies are being developed. For example, a suspended particle device (SPD) type of smart glass is typically dark or opaque in a non-activated state, and becomes transparent when activated in response to an applied voltage. States between high opaqueness (i.e., low transmittance) and high transparency (i.e., high transmittance) may be achieved by adjusting the applied voltage. While SPD-type smart glass has a fast response time when switching from a low-transmittance (i.e., high opaqueness) state to a high-transmittance (i.e., high transparency) state, SPD-type of smart glass has a slow response time when switching from a high-transmittance (i.e., high transparency) state to a low-transmittance (i.e., high opaqueness) state.

Another smart glass technology is liquid crystal technology. Similar to SPD-type smart glass, liquid crystal (LC) type smart glass is dark or opaque in the non-activated state, and becomes transparent when activated in response to a voltage being applied. While the response times associated with LC-type smart glass are relatively fast whether switching from a low-transmittance (i.e., high opaqueness) state to a high-transmittance (i.e., high transparency) state, or vice versa, LC-type smart glass has a much smaller range of transmittances (also known as a transmission range or a transmittance dynamic range) than SPD-type smart glass. For example, while the transmittance dynamic range of LC-type smart glass may be from roughly about 1 percent transmittance to 50 percent transmittance, the transmittance dynamic range of SPD-type smart glass may be roughly from about 1 percent transmittance to 80 percent transmittance, but is not limited thereto.

SUMMARY

Certain embodiments described herein relate see-through dimming panels. In accordance with an embodiment, a see-through dimming panel includes a first transparent substrate layer, a second transparent substrate layer and a suspended-particle-device (SPD) layer between the first and second transparent substrate layers. The dimming panel also includes a first transparent conductor layer between the first transparent substrate layer and the SPD layer, and a second transparent conductor layer between the second transparent substrate layer and the SPD layer. A first electrode is electrically coupled to the first transparent conductor layer, a second electrode is electrically coupled to a first end of the second transparent conductor layer, and a third electrode is electrically coupled to a second end of the second transparent conductor layer opposite the first end. An electric potential difference applied between the first and second electrodes controls a transmittance level of the SPD layer. More specifically, the electric potential difference applied between the first and second electrodes results in a longitudinal electric field that causes suspended particles in the SPD layer to align. An electric potential difference applied between the second and third electrodes controls a speed at which the transmittance level of the SPD layer decreases when the electric potential difference applied between the first and second electrodes controls is decreased. More specifically, the electric potential difference applied between the second and third electrodes results in a transverse electric field that causes microscopic heating of the SPD layer, which increases Brownian motion of the suspended particles in the SPD layer.

In accordance with an embodiment, the dimming panel also includes circuitry to control the electric potential difference between the first and second electrodes, and the electric potential difference between the second and third electrodes. Such circuitry can include, e.g., a first voltage supply used to selectively provide the electric potential difference between the first and second electrodes, and a second voltage supply used to selectively provide the electric potential difference between the second and third electrodes. This circuitry can be adapted to selectively adjust the electric potential difference between the first and second electrodes, and selectively adjust the electric potential difference between the second and third electrodes.

In accordance with an embodiment, the circuitry is adapted to increase the electric potential difference between the first and second electrodes to increase the transmittance of the SPD layer. Additionally, the circuitry is adapted to decrease the electric potential difference between the first and second electrodes to decrease the transmittance of the SPD layer. Further, the circuitry is adapted to increase the electric potential difference between the second and third electrodes to increase a rate at which the transmittance of the SPD layer is decreased when the electric potential difference between the first and second electrodes is decreased. The circuitry may also be adapted to decrease the electric potential difference between the first and second ends of the transparent conductor layer to decrease a rate at which the transmittance of the SPD layer is decreased.

In accordance with an embodiment, the see-through dimming panel includes one or more light sensors that detect ambient visible light that is incident on the optical sensor(s) and produce one or more signals indicative of an intensity of the detected ambient visible light. The dimming panel can also include a controller that adjusts the electric potential difference applied between the first and second electrodes, and/or the electric potential difference applied between the second and third electrodes, in dependence one or more of the signals produced by at least one of the one or more light sensors. In a specific embodiment, the controller adjusts the electric potential difference applied between the first and second electrodes, and the electric potential difference applied between the second and third electrodes, in order to maintain an intensity level of the ambient light that travels through the see-through dimming panel substantially equal to a specified intensity level, which may be specified by a user via a user interface.

In accordance with an embodiment, a see-through, near-eye mixed reality head mounted display (HMD) device includes one or more of the dimming panels summarized above. Accordingly, certain embodiments described herein relate to HMD devices including one or more dimming panels. The dimming panels described herein can alternative by included in see-through non-HMD display devices or dimmable windows, but are not limited thereto.

Certain embodiments described herein relate to methods for use with a SPD layer sandwiched between a first transparent conductor layer and a second transparent conductor layer. Such a method can include adjusting a transmittance of the SPD layer by selectively adjusting an electric potential difference between the first and second transparent conductor layers, and selectively adjusting an electric potential difference between first and second ends of the second transparent conductor layer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Certain embodiments described herein relate to a see-through dimming panel, which can also be referred to as a switchable glass panel or a smart glass panel, or more succinctly as a dimming panel, switchable glass, or smart glass. For consistency, the terms see-through dimming panel and dimming panel will typically be used throughout this description. Other embodiments relate to methods for use with a dimming panel, and devices or systems that include a dimming panel. For example, certain embodiments described here relate see-through, near-eye mixed reality head mounted display devices that include one or more dimming panels.

Figure 1A:
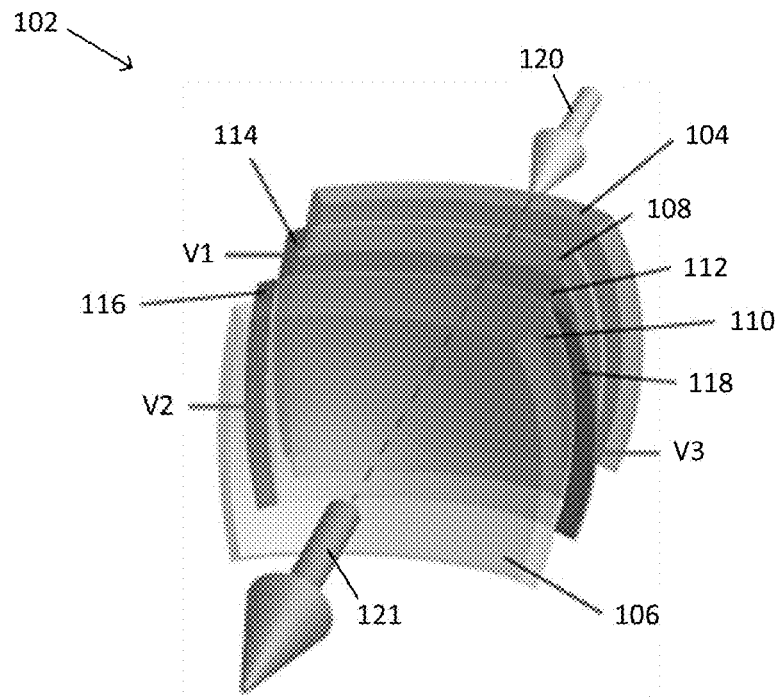
FIG. 1A is an exploded view of a see-through dimming panel, according to an embodiment of the present technology.
Figure 1B:
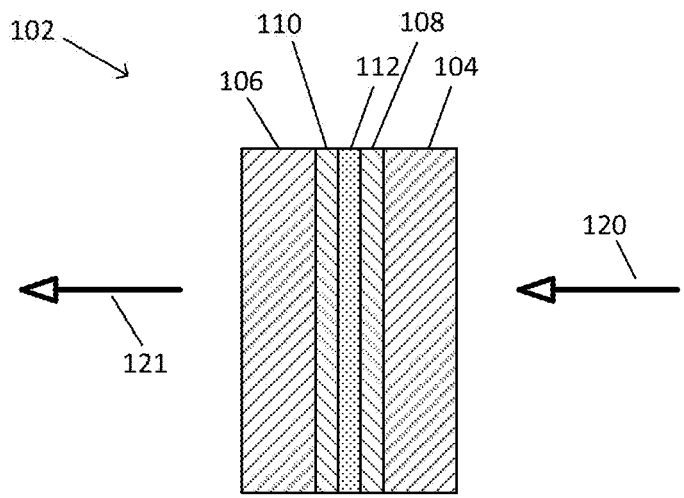
FIG. 1B illustrates an exemplary cross section of an embodiment of the see-through dimming panel, where the various layers (or portions thereof) are planar.
Figure 1C:
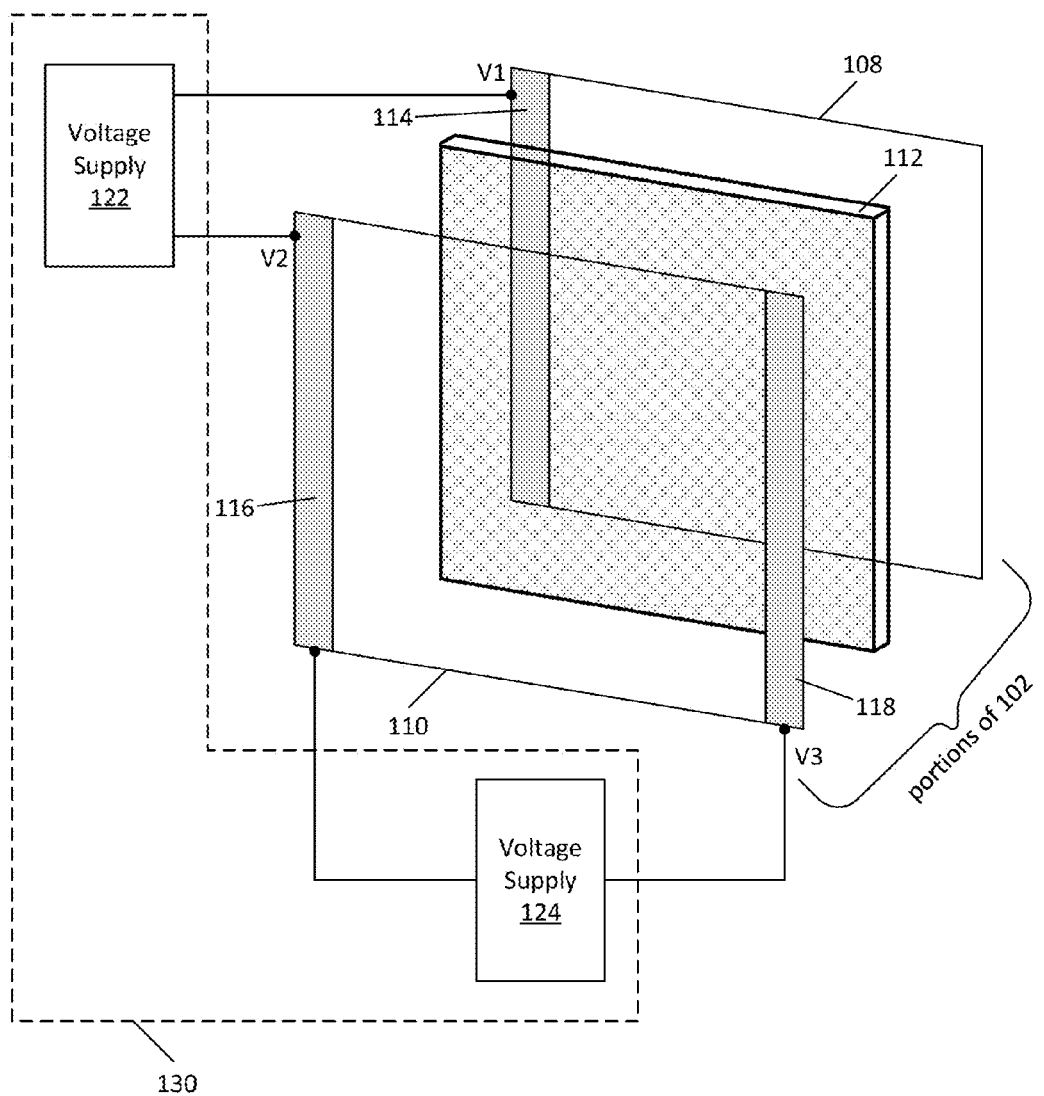
FIG. 1C is an exploded view of just certain layers of the see-through dimming panel, where the portions of the various layers shown therein are planar.

FIG. 1A is an exploded view of a see-through dimming panel 102, according to an embodiment of the present technology. While the various layers shown in FIG. 1A are illustrated as being curved in three-dimensions, these layers can alternatively be curved in only two-dimensions, or can be planer (or portions thereof can be planar). For example, FIG. 1B illustrates an exemplary cross section of an embodiment of the see-through dimming panel 102, where the various layers (or portions thereof) are planar. FIG. 1C is an exploded view of just certain layers of the see-through dimming panel 102, where the portions of the various layers shown therein are planar. While the various layers shown in FIGS. 1A-1C are shown as being generally rectangular, these layers may have other shapes. For example, where the dimming panel 102 is included in a head mounted display device, the shapes of the various layers may resemble the shape of eye glasses or a visor, but are not limited thereto.

Referring to FIGS. 1A and 1B, the see-through dimming panel 102 is shown as including a first transparent substrate layer 104, a second transparent substrate layer 106, and a suspended-particle-device (SPD) layer 112 between the first and second transparent substrate layers 104, 106. A first transparent conductor layer 108 is between the first transparent substrate layer 104 and the SPD layer 112. The first transparent conductor layer 108 can thus be arranged on a surface the SPD layer 112, or on a surface of the transparent substrate layer 104. A second transparent conductor layer 110 is between the second transparent substrate layer 106 and the SPD layer 112. The second transparent conductor layer 110 can thus be arranged on a surface of the SPD layer 112 or on a surface of the second transparent substrate layer 106.

In an embodiment, the first and second transparent substrate layers 104, 106 are rigid, so as to provide a support structure and/or protection for one or more of the other layers that are flexible and/or easily damaged. The first and second transparent substrate layers 104, 106 can be made of glass, plastic or some other transparent material that preferably has a very low electrical conductivity (so that they insulate their respective adjacent transparent conductor layers 108, 110). In one embodiment the first and second transparent substrate layers 104, 106 are made of the same transparent material. In an alternative embodiment the first transparent substrate layer 104 is made of a different transparent material than the second transparent substrate layer 106. The thicknesses of the first and second transparent substrate layers 104, 106 can be on the order of about 1 millimeter (mm), but are not limited thereto.

In an embodiment, the first and second transparent conductor layers 108, 110 are made of one or more transparent conductive films (TCFs). For example, the first and second transparent conductor layers 108, 110 can be made of a transparent conductive oxide (TFO), such as, but not limited to, tin-doped indium oxide (ITO), aluminum doped zinc-oxide (AZO) or indium-doped cadmium-oxide. For another example, the first and second transparent conductor layers 108, 110 can be made of a transparent conduct polymer, such as, but not limited to, poly(3,4-ethylenedioxythiophene) (PEDOT) or poly(4,4-dioctylcyclopentadithiophene). In one embodiment the first and second transparent conductor layers 108, 110 are made of the same electrically conductive transparent material. In an alternative embodiment the first transparent conductor layer 108 is made of a different transparent electrically conductive material than the second transparent conductor layer 110. The thicknesses of the first and second transparent conductor layers 108, 110 can be on the order of about 100 nanometers (nm), but are not limited thereto.

In FIGS. 1A and 1B, the arrow labeled 120 is representative of light that is incident on the dimming panel 102, and the arrow labeled 121 is representative of light exiting the dimming panel 102. Depending on the transmittance of the dimming panel 102, the dimming panel 102 will cause the intensity of the exiting light 121 to be attenuated or dimmed relative to the intensity of the incident light. For example, if the dimming panel has a transmittance of 60 percent, then the intensity of the exiting light 121 will be 60 percent of (i.e., 40 percent less than) the intensity of the incident light 120. The SPD layer 112, which is described below, is used to control the transmittance of the dimming panel 102.

The SPD layer 112 includes small particles (e.g., rod-like nano-scale particles) suspended in a liquid between two pieces (e.g., sheets) of transparent glass or plastic. Accordingly, the SPD layer 112 can be made up of multiple sublayers. One side of the SPD layer 112 is adjacent to and in contact with the first transparent conductor layer 108, and the other opposing side of the SPD layer 112 is adjacent to and in contact with the second transparent conductor layer 110. When no voltage (i.e., no electric potential difference) is applied between the two opposing sides of the SPD layer 112, the suspended particles are randomly organized which results in the particles blocking light, and thus, causes a low transmittance. An electric potential difference can be applied between two opposing sides of the SPD layer 112 by applying an electric potential difference between the first and second transparent conductor layers 108, 110. Application of an electric potential difference between the opposing sides of the SPD layer 112 results in a longitudinal electric field (normal to the main surfaces of the SPD layer) that causes the suspended particles to align and let light pass therethrough, thereby increasing the transmittance. Varying the electric potential difference applied between the two opposing sides of the SPD layer 112 varies the orientation of the suspended particles, thereby changing the transmittance. The thickness of the SPD layer 112 can be on the order of about 50 to 100 nanometers (nm), but is not limited thereto.

Referring specifically to FIG. 1A, a first electrode 114 is electrically coupled to the first transparent conductor layer 108, a second electrode 116 is electrically coupled to a first end of the second transparent conductor layer 108, and a third electrode 118 is electrically coupled to a second end of the second transparent conductor layer 108, wherein the second end is opposite or opposes the first end.

The term "side" as used herein refers to one of the two main surfaces of a layer, i.e., one of the two surfaces (of a layer) having the greatest surface area. By contrast, the term "end" as used herein refers to one of the minor surfaces or edges of a layer. For example, a rectangular sheet of glass or plastic can be considered to have two opposing sides, and four ends. Similarly, a rectangular transparent conductor layer can be considered to having two opposing sides, and four ends. For another example, an octagonal shaped layer can be considered to have two opposing sides, and eight ends. Such layers need not be a polygon to have two sides and multiple ends. For example, a circular or oval shaped layer can be considered to have two opposing sides, with opposing ends of such a layer being points at or near the edges of the layer that are approximately 180 degrees apart.

In an embodiment, a first voltage (V1) is selectively applied to the first electrode 114, a second voltage (V2) is selectively applied to the second electrode 116, and a third voltage (V3) is selectively applied to the third electrode 118. A single voltage supply can be used to generate the three voltages V1, V2 and V3 by appropriately stepping up and or stepping down voltage levels. Alternatively, three voltage supplies can be used to generate the three voltages V1, V2 and V3. It is also possible that one voltage supply is used to generate two out of three of the voltages, and a second voltage supply is used to generate the third one of the three voltages. Other variations are also possible, as would be appreciated by one or ordinary skill in the art. FIG. 1C, described below, illustrates a portion of an exemplary system or apparatus including two voltage supplies.

Referring to FIG. 1C, a first voltage supply 122 produces an electric potential difference between the first and second electrodes 114, 116, which provides an electric potential difference between the first and second transparent conductor layers 109, 110. As explained above, this electric potential difference results in a longitudinal electric field (normal to the main surfaces of the SPD layer 112) that causes the suspended particles to align and let light pass therethrough, thereby increasing the transmittance. Still referring to FIG. 1C, a second voltage supply 124 produces an electric potential difference between the second and third electrodes 116, 118, which provides an electric potential difference between opposing ends of the second transparent conductor layer 110. This electric potential difference results in a transverse electric field, which is parallel to the second transparent conductor layer 110, and thus, is parallel to the main surfaces of the SPD layer 112. The transverse electric field causes microscopic heating of the second transparent conductor layer 110 and its neighboring SPD layer 112. Benefits of such microscopic heating are discussed below.

In an embodiment, the first and second voltage supplies 122, 124 are part of control circuitry 130 that controls the electric potential difference between the first and second electrodes 114, 116, and the electric potential difference between the second and third electrodes 116, 118. Such control circuitry 130 can include alternative and/or additional components. For example, the control circuitry 130 can be used to adjust the voltages produced by the voltage supplies 122, 124, or can alternatively step-up or step-down voltages produced by the voltage supplies 122, 124 to desired levels. The control circuitry 130 can also include one or more switches that selectively connect and disconnect terminals of the voltage supply 122 to and from the first and/or second electrodes 114, 116, and/or one or more switches that selectively connect and disconnect terminals of the voltage supply 124 to and from the second and/or third electrodes 116, 118. The control circuitry 130 can also include a microcontroller and/or can interface with an external microcontroller or processor.

When V1, V2 and V3 are grounded, or disconnected, respectively, from the first, second and third electrodes 114, 116, 118, the SPD layer 112 will be in its non-activated state. When in its non-activated stated, the SPD layer 112 is at its minimum transmittance, and thus, is dark or opaque. For the purpose of this description, it can be assumed that the transmittance of the SPD layer 112 during its non-activated state is about 1 percent. However, other transmittances may correspond to the non-activated state. Preferably, the minimum transmittance of the SPD layer 112 is as close to 0 percent as possible, to provide for the highest transmittance dynamic range as possible. The SPD layer 112 will be in its minimum transmittance or non-activated state when an electrical potential difference is not applied between the first and second electrodes 114, 116, and more specifically between the first and second transparent conductor layers 108, 110, and even more specifically between opposing sides of the SPD layer 112. This means it would also be possible to put the SPD layer 112 in its minimum transmittance or non-activated state by setting V1 and V2 to the same non-zero level.

When an electric potential difference is applied between the first and second electrodes 114, 116, the SPD layer 112 will be in its activated state, during which the transmittance of the SPD layer 112 is increased. For the purpose of this description, it can be assumed that the maximum transmittance of the SPD layer 112 during its activated state is 80 percent. However, other maximum transmittances may be possible. Preferably, the maximum transmittance of the SPD layer 112 is as close to 100 percent as possible, to provide for the highest transmittance dynamic range as possible. The SPD layer 112 will be in its high transmittance or activated state when an electrical potential difference is applied between the first and second electrodes 114, 116, and more specifically between the first and second transparent conductor layers 108, 110, and even more specifically between opposing sides of the SPD layer 112. In accordance with specific embodiments, the electrical potential difference applied between the first and second electrodes 114, 116 is an AC voltage (ACV). The maximum AC voltage, which is used to achieve the maximum transmittance, can be, e.g., 120 VAC, but is not limited thereto. Different levels of AC voltage can be used to achieve different transmittance levels between the maximum and minimum transmittance levels of the SPD layer 112. In an embodiment, to avoid degradation or damage to the SPD layer 112 via an electric polarizing effect, the AC voltage applied between the first and second electrodes 114, 116 is absent of a DC component or has a negligible DC component.

The SPD layer 112 has a fast response time when switching from a low-transmittance (i.e., high opaqueness) state to a high-transmittance (i.e., high transparency) state, by application of an electrical potential difference between the opposing sides of the SPD layer 112. This fast response time occurs because the suspended particles in the SPD layer align very quickly when an electrical potential difference is applied between opposing sides of the SPD layer.

In order to switch the SPD layer 112 from a high-transmittance (i.e., high transparency) state to its minimum transmittance (i.e., highest opaqueness) state, the electrical potential difference should no longer be applied between the first and second electrodes 114, 116 (and more specifically, between the opposing sides of the SPD layer 112). When an electrical potential difference is no longer be applied between the first and second transparent conductor layers 108, 110 (and thus, between the opposing sides of the SPD layer 112), the suspended particles within the SPD layer 112 engage in Brownian motion to become randomly oriented. This Brownian motion engaged in by the suspended particles in the SPD layer 112 (when the electrical potential difference is no longer applied between the opposing sides of the SPD layer 112) is relatively slow compared to how fast the suspended particles in the SPD layer 112 are aligned in response to an electrical potential difference being applied between the opposing sides of the SPD layer. In other words, removing the voltage applied between the first and second transparent conductor layers 108, 110 alone will result in a relatively slow response time, e.g., on the order of about 15 to 20 seconds. Where the desire is to reduce the transmittance of the SPD layer 112 from a first level to a lower second level (that is above the minimum transmittance), rather than removing the electric potential difference between the opposing sides of the SPD layer 112, the electric potential difference can be reduced to an appropriate level used to achieve the second level of transmittance. Further, a controlled gradual reduction in the electric potential difference between the opposing sides of the SPD layer 112 can be used to achieve a controlled gradual reduction in the transmittance of the SPD layer 112. Conversely, a controlled gradual increase in the electric potential difference between the opposing sides of the SPD layer 112 can be used to achieve a controlled gradual increase in the transmittance of the SPD layer 112.

Certain embodiments of the present technology, which are described below, speed up the response time associated with transitioning the SPD layer 112 from a high-transmittance (i.e., high transparency) state to a low-transmittance (i.e., high opaqueness) state. More generally, certain embodiments of the present technology, which are described below, increase the response time associated with reducing the transmittance of the SPD layer 112. Such an increase in the response time is achieved by using the second and third electrodes 116, 118 (which are electrically coupled to opposing ends of the second transparent conductor layer 110) to generate a transverse electric field parallel to the second transparent conductor layer 110, and thus, parallel to the main surfaces of the SPD layer 112. This transverse electric field causes microscopic heating of the second transparent conductor layer 110, which heats up the SPD layer 112, which has the effect of speeding up the Brownian motion engaged in by the suspended particle in the SPD layer 112. This speeding up of the Brownian motion is maximized when the electrical potential difference is no longer applied between the opposing sides of the SPD layer 112. For an example, the transverse electric field may increase the temperature of the SPD layer 112, which is in contact with the second transparent conductor layer 110, by about 10 to 60 degrees Celsius, but is not limited thereto. Advantageously, this microscopic heating caused by the transverse electric field will impart a negligible temperature change to the first and second transparent substrate layers 104, 106, and thus, will not be readily noticeable to a user that touches or otherwise comes in contact with the dimming panel 102.

In accordance with an embodiment, the transverse electric field is generated by applying electrical potential difference between the second and third electrodes 116, 118. The magnitude of the electrical potential difference (applied between the second and third electrodes 116, 118) can be on the order of about 2V to 10V, but is not limited thereto. The electrical potential difference (applied between the second and third electrodes 116, 118) can be an AC voltage. Alternatively, the electrical potential difference (applied between the second and third electrodes 116, 118) can be a DC voltage.

The use of the transverse electric field reduces the time it takes for the SPD layer 112 (and more generally, the dimming panel 102) to transition from its maximum transmittance (i.e., highest transparency) state to its minimum transmittance (i.e., highest opaqueness) state to about 1 or 2 seconds. Comparatively, without the use of the transverse electric field, it takes the SPD layer 112 (and more generally, the dimming panel 102) about 15 to 20 seconds to transition from its maximum transmittance (i.e., highest transparency) state to its minimum transmittance (i.e., highest opaqueness). Accordingly, use of the transverse electric field provides for about a 10× reduction in the transition time, compared to if the transverse electric filed were not used.

The magnitude and rate of change of the electrical potential difference (applied between the second and third electrodes 116, 118) can be adjusted to control how fast the SPD layer 112 transitions from a high-transmittance (i.e., high transparency) state to a low-transmittance (i.e., high opaqueness) state. In other words, the transition time can be controlled by controlling the magnitude and rate of change of the transverse electric field. The transition time can also be controlled by controlling the magnitude and rate of change of the longitudinal electric field.

Calibration and characterization of the SPD layer 112 can be performed to understand how the SPD layer 112 responds to changes in the longitudinal and transverse electric fields. For example, during or after the assembly of the dimming panel 102, transmittance levels (and changes therein, and rates of changes therein) in response electric potential difference levels (and changes therein, and rates of changes therein) between the first and second electrodes 114, 116 can be measured and recorded and used to tune control circuitry. Additionally, rates of reductions in transmittance levels in response increases in the electric potential difference levels between the second and third electrodes 116, 118 can be measured and recorded and used to tune control circuitry. Further, tests can be performed to characterize how the transmittance of the SPD layer 112 changes in response to simultaneous and/or sequential changes in the electric potential differences between the first and second electrodes 114, 116, and between the second and third electrodes 116, 118.

Figure 3:
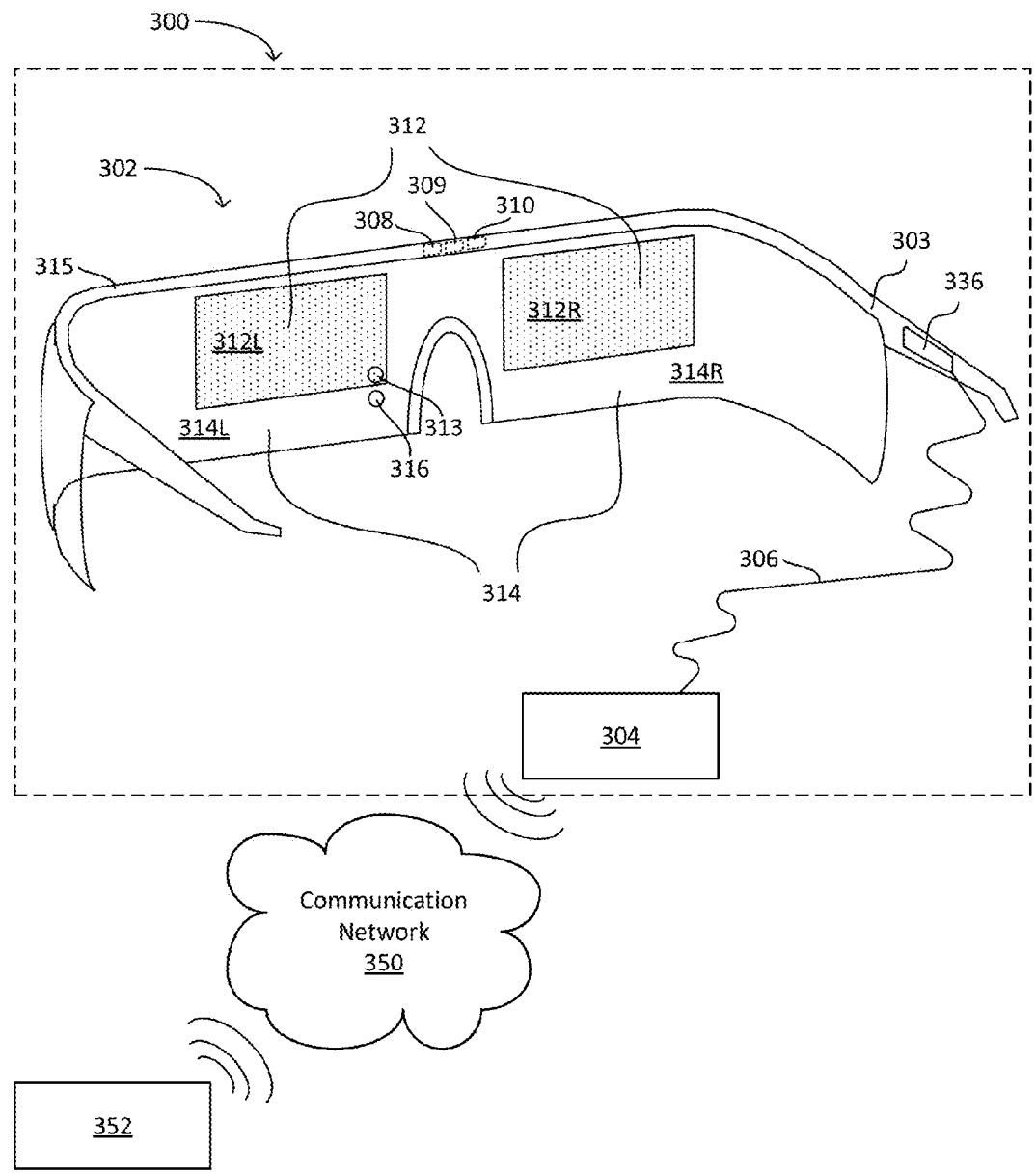
FIG. 3 illustrates example components of a see-through, near-eye mixed reality display device system that can include one or more of the dimming panels described with reference to FIGS. 1A-2B

Additionally, one or more sensors can be used to detect when the SPD layer 112 reaches a desired transmittance level, at which point the transverse electric field can be removed, and an appropriate electrical potential difference can be applied between the first and second electrodes 114, 116 to maintain the transmittance of the SPD layer 112 at the desired transmittance. Examples of such sensors are described below with reference to FIGS. 3-5. While the sensors described with reference to FIGS. 3-5 are shown as being incorporated into a head mounted display device, similar sensors can be incorporated into other see-through displays, or more generally, into other devices or systems that include the dimming panel 102 described herein.

Figure 2A:
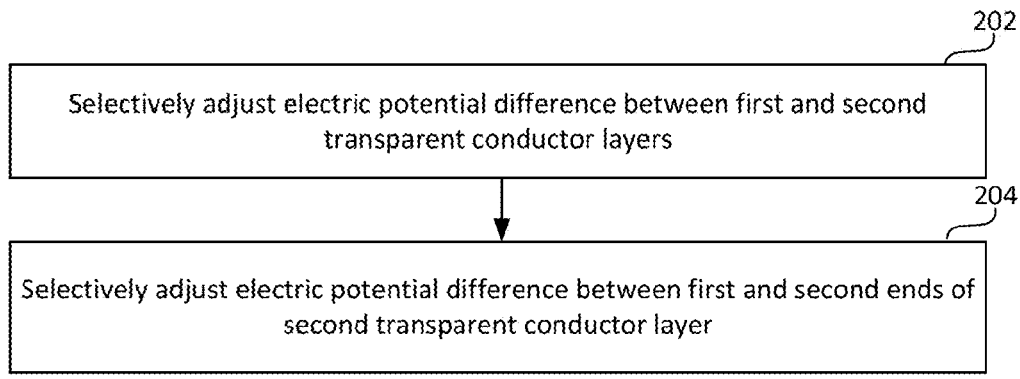
FIGS. 2A and 2B are high level flow diagrams used to summarize methods for adjusting a transmittance of an SPD layer sandwiched between first and second transparent conductor layers.

The high level flow diagram of FIG. 2A will now be used to summarize a method for use with a SPD layer (e.g., 112) sandwiched between a first transparent conductor layer (e.g., 108) and a second transparent conductor layer (e.g., 110). More specifically, such a method is for use in adjusting a transmittance of the SPD layer (e.g., 112). Referring to FIG. 2A, step 202 involves selectively adjusting an electric potential difference between the first and second transparent conductor layers (e.g., 108, 110), which as mentioned above, involves selectively adjusting a longitudinal electric field. Step 204 involves selectively adjusting an electric potential difference between first and second ends of the second transparent conductor layer (e.g., 112), which as mentioned above, involves adjusting a transverse electric filed. More generally, step 202 involves selectively adjusting the electric potential difference between opposing sides of the SPD layer 112, and step 204 involves adjusting the electric potential difference between opposing ends of one of the transparent conductor layers. Referring briefly back to FIG. 1C, the first voltage supply 122 can be used to perform step 202, and the second voltage supply 124 can be used to perform step 204. More generally, the circuitry 130 can be used to perform step 202 and 204.

Figure 2B:
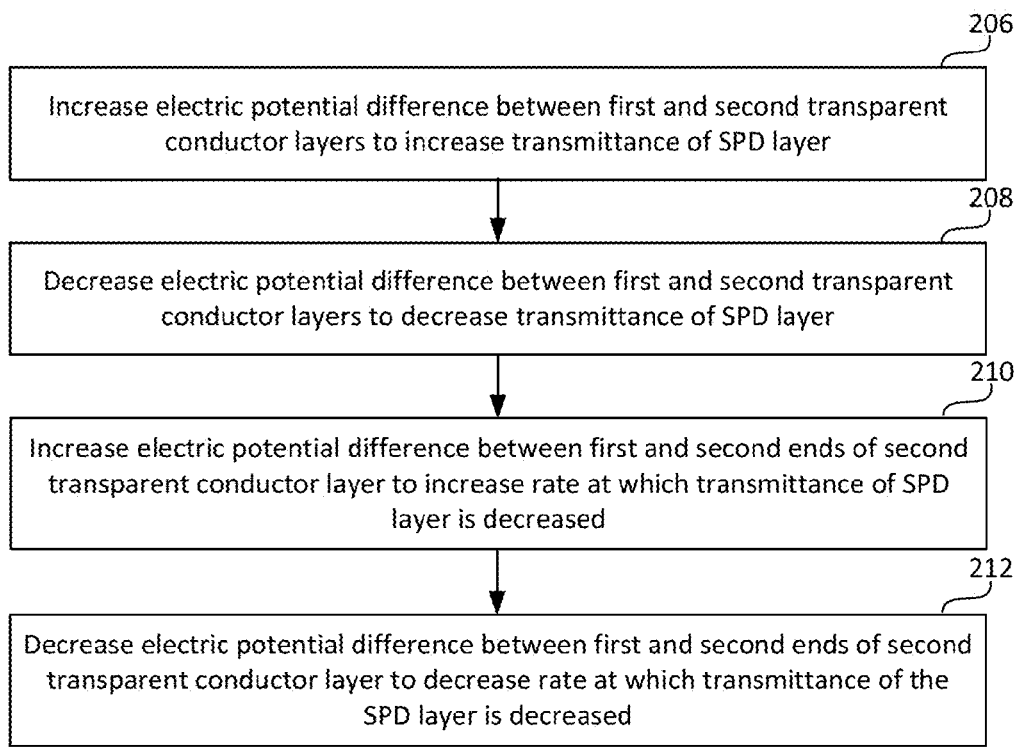

FIG. 2B is a high level flow diagram that is used to summarize additional details of how the transmittance of the SPD layer (e.g., 112) can be adjusted. More specifically, steps 206 and 208 provide additional details of step 202 in FIG. 2A, and steps 210 and 212 provide additional details of step 204 in FIG. 2A. Referring to FIG. 2B, step 206 involves increasing the electric potential difference between the first and second transparent conductor layers (e.g., 108, 110) to increase the transmittance of the SPD layer (e.g., 112). Step 208 involves decreasing the electric potential difference between the first and second transparent conductor layers (e.g., 108, 110) to decrease the transmittance of the SPD layer (e.g., 112). The electric potential difference between the first and second transparent conductor layers (e.g., 108, 110) can be decreased by completely removing the electric potential difference between the first and second transparent conductor layers (e.g., 108, 110), or by reducing the magnitude of the electric potential difference between the first and second transparent conductor layers (e.g., 108, 110).

Step 210 involves increasing the electric potential difference between the first end and second ends of the second transparent conductor layer (e.g., 110) to increase a rate at which the transmittance of the SPD layer (e.g., 112) is decreased when the electric potential difference between the first and second transparent conductor layers (e.g., 108, 110) is decreased. As explained above, increasing of the electric potential difference between the first end and second ends of the second transparent conductor layer (e.g., 110), which can be achieved using an AC or DC voltage, results in a transverse electric field (parallel to a surface of the SPD layer e.g., 112) that causes microscopic heating of the SPD layer (e.g., 112). This microscopic heating increases Brownian motion of suspended particles in the SPD layer, and thereby increases how quickly the suspended particles transition from being aligned to be randomly dispersed.

Step 212 involves decreasing the electric potential difference between the first and second ends of the second transparent conductor layer (e.g., 110) to decrease a rate at which the transmittance of the SPD layer (e.g., 112) is decreased. The electric potential difference between the first and second ends of the second transparent conductor layer (e.g., 110) can be performed by completely removing the electric potential difference between the first and second ends of the second transparent conductor layer (e.g., 110), or by reducing a magnitude of the electric potential difference between the first and second ends of the second transparent conductor layer (e.g., 110).

Referring briefly back to FIG. 1C, the first voltage supply 122 can be used to perform steps 206 and 208, and the second voltage supply 124 can be used to perform steps 210 and 212. More generally, the circuitry 130 can be used to perform step steps 206, 208, 210 and 212.

Certain ones of the above described steps can be performed simultaneously or interleaved with other steps. For example, step 208 and 210 can be performed simultaneously. In such a case, the decreasing (at step 208) of the electric potential difference between the two sides of the SPD layer (e.g., 112) will increase the influence of thermal randomization or tendency of suspended particles in the SPD layer to undergo Brownian motion that is achieved by step 210.

The above described dimming panel 102 can be incorporated into a variety of applications. In particular, dimming panels described herein are especially applicable in systems where it is desirable to dynamically control and filter light. The dimming panels described herein can be used as-is or can be components within larger systems. For example, the dimming panel 102 can be included in windows or see-through partitions having adjustable transmittances. Such windows and/or see-through partitions can be used in residences and/or commercial buildings. It is also possible that such windows can be used as windows in vehicles, such as, but not limited to, cars, buses, trucks and airplanes.

In accordance with specific embodiments, the above described dimming panel 102 is included in a see-through, near-eye mixed reality head mounted display device. Exemplary details of such a head mounted display device, including the above described dimming panel 102, will now be described with reference to FIGS. 3-6.

FIG. 3 illustrates example components of a see-through, near-eye mixed reality display device system 300. The system 300 includes a head mounted see-through, near-eye mixed reality display device 302, which can also be referred to herein simply as a head mounted display device 302, or even more succinctly as a display device 302. The head mounted display device 302 is shown as being in communication with a processing unit 304 via a wire 306. In other embodiments, the head mounted display device 302 communicates with the processing unit 304 via wireless communication. The processing unit 304 may take various embodiments. For example, the processing unit 304 may be embodied in a mobile device like a smart phone, tablet or laptop computer. In some embodiments, the processing unit 304 is a separate unit which may be worn on the user's body (e.g., on the user's wrist) or kept in a pocket, and includes much of the computing power used to operate the head mounted display device 302. The processing unit 304 may communicate wirelessly (e.g., WiFi, Bluetooth, infrared, RFID transmission, wireless Universal Serial Bus (WUSB), cellular, 3G, 4G or other wireless communication means) over a communication network 350 to one or more hub computing systems 352 whether located nearby in this example or at a remote location. In other embodiments, the functionality of the processing unit 304 may be integrated in software and hardware components of the display device 302.

The head mounted display device 302, which in one embodiment has the shape or form factor of wrap around eyeglasses, is intended to be worn on the head of a user so that the user can see through a display region 312 and a peripheral region 314, and thereby have an actual direct view of the space in front of the user. In FIG. 3, the see-through display region 312 is shown as including left and right see-through display sub-regions 312L and 312R respectively for viewing by the user's left and right eyes.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images, within the see-through display region 312 that are viewable by the person wearing the display device 302 while that person is also viewing real world objects through the see-through display region 312 and through a peripheral region 314 that is adjacent to but does not overlap the see-through display region 312, thereby providing an augmented reality experience. In FIG. 3, the see-through peripheral region 314 is shown as including left and right see-through peripheral sub-regions 314L and 314R that are respectively within the field-of-view of the user's left and right eyes.

Still referring to FIG. 3, a frame 315 provides a support for holding various elements of the system in place as well as a conduit for electrical connections. In this embodiment, the frame 315 provides a convenient eyeglass frame as support for the elements of the system discussed further below. In other embodiments, other support structures can be used. An example of such a structure is a visor or goggles. Embodiments of the present technology are not limited to the shapes and relative dimensions of the components of the head mounted display device 302 shown in FIG. 3. Rather, components, such as the frame 315, the see-through display region 312 and the see-through peripheral region 314 can have different shapes and/or dimensions than shown. For example, the see-through display region 312 and the see-through peripheral region 314 can be curved relative to both vertical and horizontal axes. For another example, the see-through display region 312 may be larger than shown, in which case the see-through peripheral region 314 may be smaller than shown.

The frame 315 includes left and right temples or side arms for resting on the user's ears. The temple 303 is representative of an embodiment of the right temple and includes control circuitry 336 for the display device 302. The control circuitry 336 can alternatively be located at a different position or distributed among multiple locations. In FIG. 3, a nose bridge portion of the frame 315 is shown as including an outwardly facing light sensor 308, an outwardly facing camera 309 and an outwardly facing microphone 310. However, one or more of the light sensor 308, the camera 309 and the microphone 310 can be located on other portions of the frame 315. The light sensor 308 can be used, e.g., for detecting ambient light characteristics (e.g., brightness, color content, spectrum, type of illuminant). The camera 309 can be used for capturing video and/or still images, which may include RGB and/or depth images, but is not limited thereto. The microphone 310 can be used for recording sounds and/or accepting voice commands. Data obtained using the light sensor 308, the camera 309 and/or the microphone 310 can be provided to the control circuitry 336 and/or transmitted to the processing unit 304. It is also possible that there are two outwardly facing cameras 309, e.g., one corresponding to a left eye and one corresponding to a right eye.

The outwardly facing light sensor 308 that is located on frame 315 can be used to detect characteristics, such as the intensity, of ambient light that has not yet traveled through the see-through display region or the see-through peripheral region 314. The head mounted display device 302 can also include additional light sensors to detect characteristics, such as the intensity, of ambient light that traveled through the see-through display region 312 and/or the see-through peripheral region 314. For example, still referring to FIG. 3, a light sensor 313 can be used to detect characteristics, such as the intensity, of ambient light that traveled through the see-through display region 312. Additionally, or alternatively, a light sensor 316 can be used to detect characteristics, such as the intensity, of ambient light that traveled through the see-through peripheral region 314. Each of the light sensors 308, 313 and 316 can be designed to be primarily responsive to visible light, e.g., by including optical filters that reflect and/or absorb wavelengths (e.g., infrared wavelengths) outside of the visible spectrum. For example, the light sensor 308, 313 and 316 can be designed to have a photopic response.

The control circuitry 336 provides various electronics that support the other components of head mounted display device 302. Exemplary details of the control circuitry 336 are discussed below with respect to FIG. 5. While not specifically shown in FIG. 3, elements such as ear phones, inertial sensors, a GPS transceiver and/or a temperature sensor can be mounted inside or to the temple 303. In one embodiment, such inertial sensors include a three axis magnetometer, a three axis gyro and a three axis accelerometer. The inertial sensors can be used for sensing position, orientation, and sudden accelerations of head mounted display device 302. From these movements, head position may also be determined. Some additional details of these sensors are described below with reference to FIG. 5.

As mentioned above, a user wearing the head mounted display device 302 can view virtual images, and real images, through the see-through display region 312. The user wearing the display device can also view real images through the see-through peripheral region 314. The virtual images can be generated by one or more micro-display devices (not specifically shown in FIG. 3, but discussed below with reference to FIG. 5) mounted in or to the frame 315, and optical elements such as waveguides, mirrors and/or the like, can be used to transfer or guide the virtual images to the see-through display region 312. Alternatively, left and right see-through micro-displays can be located in or on left and right see-through lenses or some other see-through substrate to provide the see-through display region 312. In other words, one or more micro-display devices located on the frame 315 can generate virtual images that are transferred to the see-through display region 312 using one or more waveguides, mirrors and/or the like, or alternatively the virtual images displayed in the see-through display region 312 can be generated using see-through displays that are coextensive with the see-through display region 312.

There are different image generation technologies that can be used to implement such see-through displays or micro-display devices. For example, transmissive projection technology can be used, where a light source is modulated by an optically active material and backlit with white light. These technologies are usually implemented using liquid crystal display (LCD) type displays with powerful backlights and high optical energy densities. Alternatively, a reflective technology, in which external light is reflected and modulated by an optically active material, can be used. Digital light processing (DLP), liquid crystal on silicon (LCOS) and Mirasol® display technology from Qualcomm, Inc. are all examples of reflective technologies. Additionally, such see through micro-displays or micro-display devices can be implemented using an emissive technology where light is generated by the display, see for example, a PicoP™ display engine from Microvision, Inc. Another example of emissive display technology is a micro organic light emitting diode (OLED) display. Companies eMagin and Microoled provide examples of micro OLED displays.

As mentioned above, while the display region 312 is see-through, the display region 312 has optical characteristics, such as a transmittance, that affect (e.g., attenuate) ambient visible light that is incident on the display region 312. For an example, the see-through display region 312 may have a 70 percent transmittance for visible light, meaning that only 70 percent of the ambient visible light that is incident on the see-through display region 312 will pass through the see-through display region 312 and be incident on the user's eyes, with the remaining 30 percent of the ambient visible light being reflected and/or absorbed by the see-through display region 312. Another way of explaining this is that the see-through display region 312 may cause ambient visible light to be dimmed by 30 percent. Since the see-through display region 312 does not occupy the user's entire FOV, if its optical characteristics are not accounted for, this will cause a non-uniformity in optical characteristics where some of the user's FOV will be darker than others. Certain embodiments of the present technology can be used to maintain substantially uniform optical characteristics, including a substantially uniform transmittance, across substantially the entire FOV of a user wearing the head mounted display device 302.

Figure 4A:
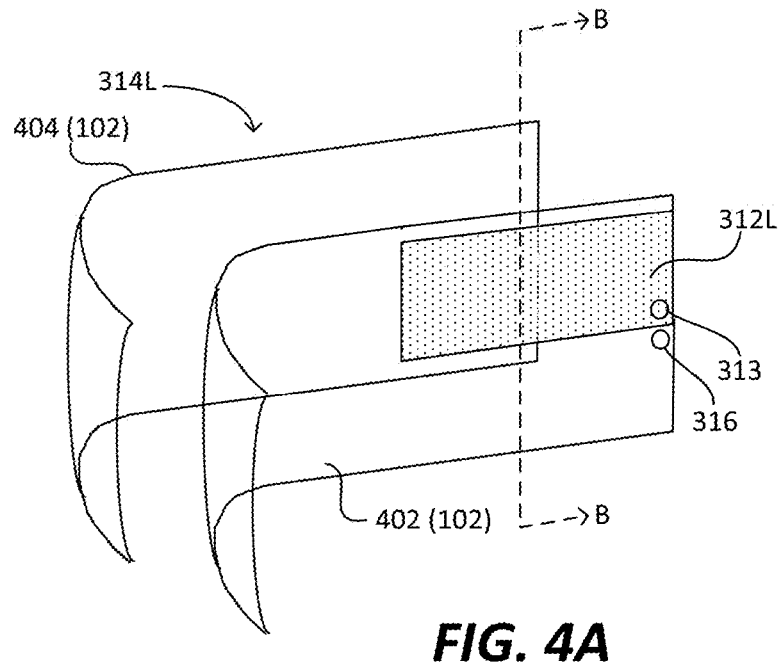
FIG. 4A illustrates components of the see-through, near-eye mixed reality display device introduced in FIG. 3, according to an embodiment.
Figure 5:
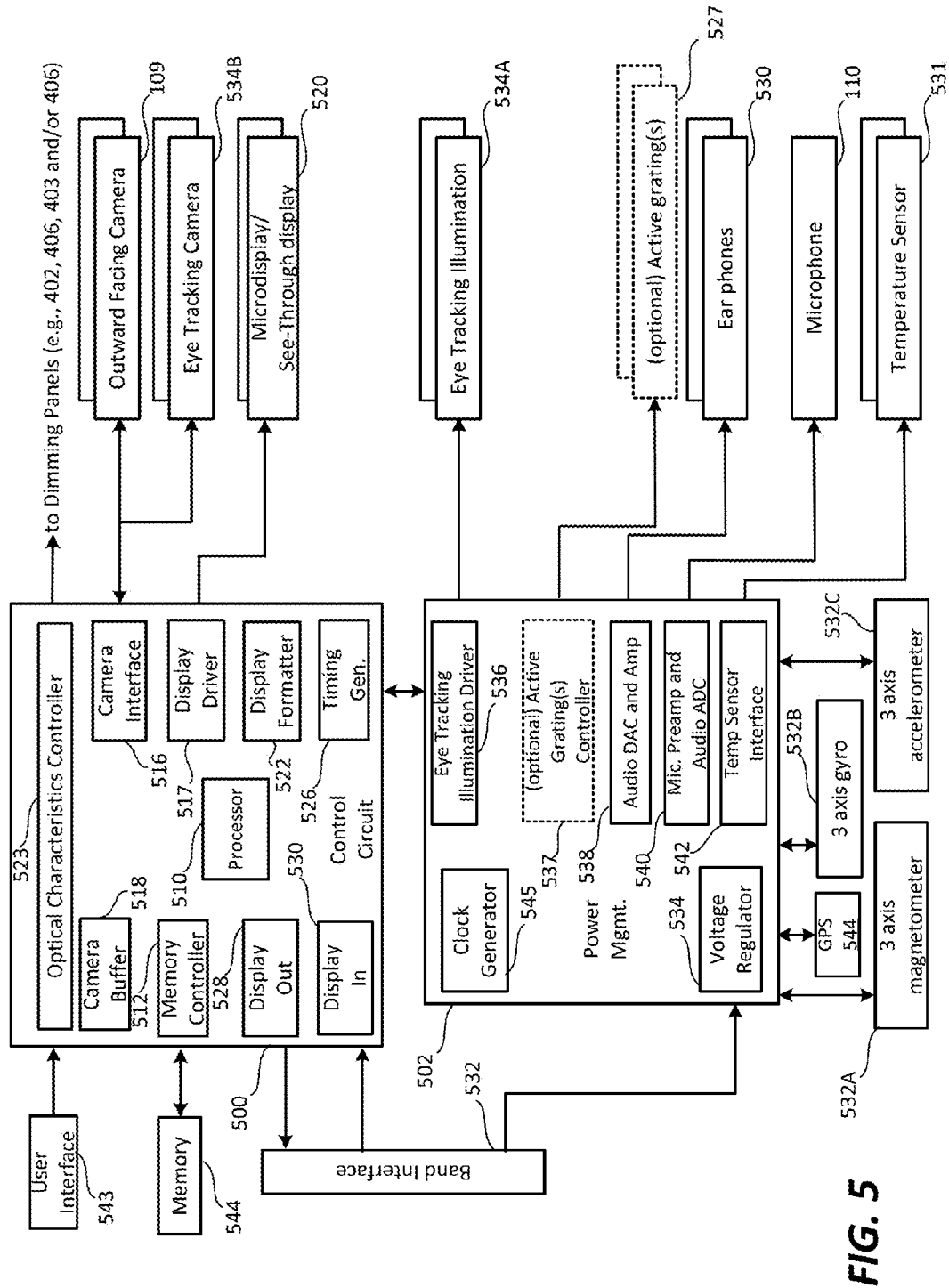
FIG. 5 is a block diagram of one embodiment of hardware and software components of a see-through, near-eye, mixed reality head mounted display device as may be used with one or more embodiments.

FIG. 4A is an exploded view of some elements of the left portion of the head mounted display device 302 introduced in FIG. 3, according to an embodiment. Referring to FIG. 4A, shown therein is the left see-through display sub-region 312L, which as noted above, is part of the see-through display region 312 along with the right see-through display sub-region 312R (shown in FIG. 3). Also shown in FIG. 4A is a left portion of a see-through dimming panel 402 that is adjacent to but not overlapping the left see-through display sub-region 312L. Although not shown in FIG. 4A, the see-through dimming panel 402 also includes a right portion that is adjacent to but not overlapping the right see-through display sub-region 312R. More specifically, in the embodiment of FIG. 4A, the see-through dimming panel 402 is coextensive with the see-through peripheral region 314 described with reference to FIG. 3. Unless stated otherwise, as the terms "overlap" and "overlapping" are used herein, if a first element is described as overlapping a second element, then first element completely or at least substantially overlaps the second element. Preferably, the see-through display region 312 and the see-through dimming panel 402 collectively cover substantially the entire FOV of a user wearing the head mounted display device 302.

In accordance with an embodiment, a transmittance of the see-through dimming panel 402 is substantially the same as a transmittance of the see-through display region 312. Beneficially, this prevents some of the user's FOV from being darker than others. Explained another way, this provides for a substantially consistent brightness across the user's entire FOV. Additionally, or alternatively, one or more other optical characteristic of the see-through dimming panel 402 and the see-through display region 312 can be substantially the same.

In accordance with an alternative embodiment, the see-through display region 312 has a transmittance that changes. The transmittance of the see-through display region 312 may change, e.g., in response to user inputs, in response to signals from the control circuitry 336 and/or in response to signals from the light sensor 308, but is not limited thereto. For example, a user may be able to change the transmittance of the see-through display region 312 using one or more buttons, a slider or some other tactile user interface (e.g., 543 in FIG. 5) located on the frame 315 of the head mounted display device 302 or using a user interface on a mobile computing device (e.g., a smartphone or tablet) that communicates with the head mounted display device 302.

Where the see-through display region 312 has a transmittance that changes, the see-through dimming panel 402 should also have a transmittance that changes so that the transmittance of the see-through dimming panel 402 can be dynamically adjusted to remain substantially the same as the transmittance of the see-through display region 312. For a specific example, control circuitry 336 can monitor the transmittance of the see-through display region 312, and adjust the transmittance of the see-through dimming panel 402 so that the transmittances of the see-through dimming panel 402 and the see-through display region 312 are substantially the same. In accordance with specific embodiments, the see-through dimming panel 402 is implemented using the dimming panel 102 described above with reference to FIGS. 1A-2B.

Figure 4B:
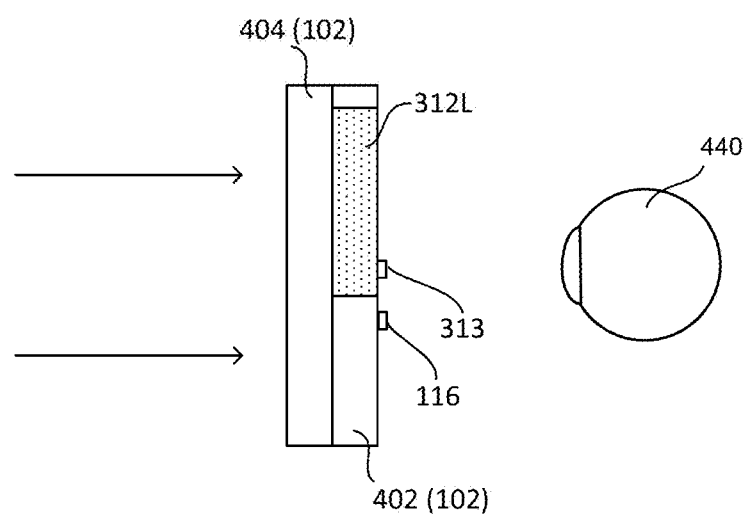
FIG. 4B is a cross-section of the components shown in FIG. 4A along line B-B in FIG. 4A.

Still referring to FIG. 4A, a further see-through dimming panel 404 overlaps both the see-through display region 312 and the see-through dimming panel 402. Assuming that the see-through display region 312 is within a first portion of the FOV of a user wearing the head mounted display device 302, and that the see-through dimming panel 402 is within a second portion of the user's FOV, then the further see-through dimming panel 404 is within both the first and second portions of the FOV of the user wearing the device 302. The further see-through dimming panel 404 has corresponding optical characteristics, including, but not limited, a corresponding transmittance. While in the exploded view of FIG. 4A the dimming panels 402 and 404 are shown as being spaced apart from one another, the panels 402 and 404 may be in contact with one another, as shown in FIG. 4B, which illustrates a cross-section along the dashed line B-B in FIG. 4A. Alternatively, there can be an air gap or a see-through material (e.g., a lens) between the dimming panels 402 and 404. There can also be a cavity or space between the dimming panels 402 and 404 that may contain other optical and/or electro-optical component(s), and/or one or more other types of component(s).

In accordance with an embodiment, the further see-through dimming panel 404 has a transmittance (and/or other optical characteristics) that can be changed. In accordance with specific embodiments, the see-through dimming panel 404 is implemented using the dimming panel 102 described above with reference to FIGS. 1A-2B.

Where light travels through two different elements, each having their own transmittance, the collective transmittance of the two elements is equal to a product of the two transmittances multiplied. For example, if the transmittance of the see-through dimming panel 402 is 70 percent, and the transmittance of the further see-through dimming panel 404 is 80 percent, then the two panels 402 and 404 have a collective transmittance of 56 percent (i.e., 0.70×0.80=0.56). Because the further see-through dimming panel 404 overlaps both the see-through display region 312 and the see-through dimming panel 402, the transmittance for the entire see-through portion of the head mounted display device 302 should remain substantially the same regardless of the transmittance of the further see-through dimming panel 404, so long as the transmittance of the see-through dimming panel 402 is substantially the same as the transmittance of the see-through display region 312.

In accordance with certain embodiments, the see-through dimming panel 402 is implemented using a first one of the dimming panels 102 described above with reference to FIGS. 1A-2B, and the see-through dimming panel 404 is implemented using a second one of the dimming panels 102 described above with reference to FIGS. 1A-2B. Alternatively, only one of the dimming panels 402 and 404 is implemented using the dimming panel 102 described above with reference to FIGS. 1A-2B, and the other one of the dimming panels 402 and 404 is implemented using a different technology. For example, the one of the dimming panels 402 and 404 that is not implemented using the dimming panel 102, can be or include an electrochromic (EC) element, a liquid crystal (LC) layer, a polymer dispersed liquid crystal (PDLC) layer, a photochromic layer, a thermochromic layer, or a MEMS micro-blinds layer.

In accordance with certain embodiments, the see-through dimming panel 404 is an active dimming panel (e.g., implemented using the dimming panel 102) having a transmittance that is adjusted in dependence on ambient visible light that is incident on the light sensor 308 shown in and discussed with reference to FIG. 3. More specifically, the light sensor 308 can detect ambient visible light that is incident on the sensor and in response thereto can produce one or more signals indicative of one or more characteristics (e.g., intensity) of the detected ambient visible light. The one or more signals produced by the light sensor 308 can be provided to the control circuitry 336 and/or the processing unit 304, at least one of which can adjust the transmittance of the see-through dimming panel 404 in dependence on at least one of the one or more signals produced by the light sensor 308. Such an embodiment can be used, e.g., to maintain a substantially constant brightness for the user as ambient light levels change. For example, assume that when ambient light levels are relatively high, the transmittance of the see-through dimming panel 404 is relatively low. When ambient light levels decrease, the transmittance of the see-through dimming panel 404 can be increased in an attempt keep the amount of ambient light that reaches the user's eyes relatively static, or to at least reduce the extent of the fluctuations in ambient light levels that reach the user's eyes.

In addition to, or instead of, using the light sensor 308 to detect characteristics of ambient light that is incident on an outer portion of the head mounted display device 302, the light sensor 313 can be used to detect characteristics (e.g., intensity and/or color content) of light that has traveled through both the see-through dimming panel 404 and the see-through display region 312, and the light sensor 316 can be used to detect characteristics (e.g., intensity and/or color content) of light that has traveled through both the see-through dimming panel 404 and the see-through dimming panel 402. Each of the light sensors 313 and 316 can produce one or more signals indicative of one or more characteristics (e.g., intensity and/or color content) of the light detected by the respective sensor. Such signals produced by the light sensors 313 and 316 can be provided to the control circuitry 336 and/or the processing unit 304, at least one of which can adjust the transmittance (and/or other optical characteristics) of the see-through dimming panel 402, the see-through dimming panel 404 and/or the see-through display region 312 to achieve substantially uniform optical characteristics (e.g., a substantially uniform transmittance) across substantially the entire FOV of a user wearing the head mounted display device 302. The positions of light sensors 313 and 316 can be different than shown in the FIG. It is also possible that multiple spatially separated light sensors 313 can be used to detect characteristics (e.g., intensity) of light that has traveled through both the see-through dimming panel 404 and the see-through display region 312, and that multiple spatially separated light sensors 316 can be used to detect characteristics (e.g., intensity) of light that has traveled through both the see-through dimming panel 404 and the see-through dimming panel 402.

In accordance with certain embodiments, the see-through dimming panel 404 can be used to control a see-through contrast ratio (STCR) associated with the portion of the device 302 that includes the see-through display region 312. For example, the see-through dimming panel 404 can be used to allow a user to adjust the STCR, or to maintain a substantially constant STCR. For the portion of the device 302 that includes the see-through display region 312, the see-through contrast ratio (STCR) refers to the ratio of the total brightness of visible light emanating from the viewing side of the of the device 302 (which includes visible light emitted by the see-through display region 312 plus ambient visible light that passes through both the dimming panel 404 and the see-through display region 312) over the brightness of the ambient visible light emanating from the viewing side of the of the device 302 (which includes the brightness of the ambient visible light that passes through both the dimming panel 404 and the see-through display region 312). The viewing side of a device refers to the side that faces a user of the device, and more specifically, the side of the device 302 that faces the user's eyes. Where the brightness of the see-through display region 312 is adjustable, the STCR can additionally, or alternatively, be controlled by adjusting the brightness of the see-through display region 312. In accordance with certain embodiments, the STCR can be determined based on signals received from one or more of the light sensors described herein, the transmittance of the see-through dimming panel 404 and/or the transmittance of see-through display region 312. Signals received from one or more of the light sensors described herein can be used in a closed loop feedback system to maintain a substantially constant STCR. The substantially constant STCR can be a default STCR level, an STCR level specified by a user using a user interface, or an STCR level specified by an application that the device 302 executes. In general, the greater the STCR, the easier it is for a user to view virtual objects displayed by the see-through display region 312.

In FIG. 4B, the see-through dimming panel 404 is shown as being in a plane that is further from a user's eyes 440 than a plane that includes the see-through dimming panel 402 and the see-through display region 312. In an alternative embodiment, these two planes can be swapped such that the see-through dimming panel 404 is closer to the user's eyes 440 than a plane that includes the see-through dimming panel 402 and the see-through display region 312. Either way, the see-through dimming panel 404 can be said to overlap both the see-through dimming panel 402 and the see-through display region 312.

In accordance with certain embodiments, regardless of the type of technology used to generate virtual images that are observable within the see-through display region 312, the see-through display region 312 does not take up the entire field-of-view (FOV) of the user wearing the head mount display device 302. Rather, at least a portion of the see-through peripheral region 314 will also be within the FOV of the user wearing the head mounted display device 302. In alternative embodiments, the see-through display region 312 takes up the entire FOV of the user, in which case, the see-through dimming panel 402 may be eliminated and the see-through dimming panel 404 may be coextensive with the see-through display region that takes up the entire FOV. In such alternative embodiments, the see-though dimming panel 404 can be an active dimming panel that can be controlled to adjust a see-through contrast ratio (STCR) and/or other optical characteristics. More specifically, the dimming panel 404 can be implemented as the dimming panel 102 described above with reference to FIGS. 1A-2B.

Figure 4C:
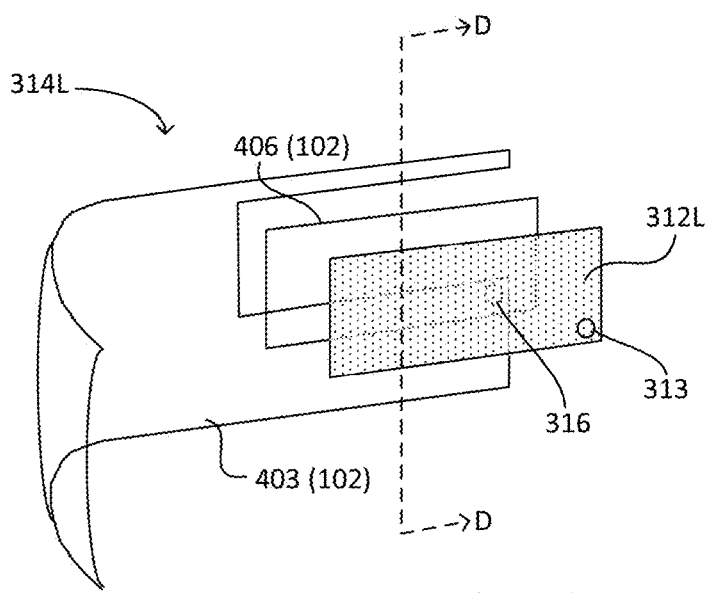
FIG. 4C illustrates components of a see-through, near-eye mixed reality head mounted display device introduced in FIG. 3, according to another embodiment.

FIG. 4C is an exploded view of some elements of the left portion of the head mounted display device 302 introduced in FIG. 3, according to an alternative embodiment. Referring to FIG. 4C, shown therein is the left see-through display sub-region 312L, which as noted above, is part of the see-through display region 312 along with the right see-through display sub-region 312R (shown in FIG. 3). Also shown in FIG. 4C is a left portion of a see-through dimming panel 302 that is adjacent to but not overlapping the left see-through display sub-region 312L. Although not shown in FIG. 4C, the see-through dimming panel 403 also includes a right portion that is adjacent to but not overlapping the right see-through display sub-region 312R. More specifically, in the embodiment of FIG. 4C, the see-through dimming panel 403 is coextensive with the see-through peripheral region 314 described with reference to FIG. 3. While in the exploded view of FIG. 4C the see-though dimming panel 406 and the see-through display region 312 are shown as being spaced apart from one another, the panel 406 may be in contact with the see-through display region 312, as shown in 4D, which illustrates a cross-section along the dashed line D-D in FIG. 4C. Alternatively, there can be an air gap or a see-through material (e.g., a lens) between the see-through dimming panel 406 and the see-through display region 312. There can also be a cavity or space between the dimming panels 402 and 404 that may contain other optical and/or electro-optical component(s), and/or one or more other types of component(s).

Preferably, the see-through display region 312 and the see-through dimming panel 403 collectively cover substantially the entire FOV of a user wearing the head mounted display device 302. Also shown in FIG. 4C is a further see-through dimming panel 406 overlapping the see-through display region 312. Although not shown in FIG. 4C, the see-through dimming panel 406 also includes a right portion that overlaps the right see-through display sub-region 312R. More specifically, in the embodiment of FIG. 4C, the see-through dimming panel 406 is coextensive with the see-through display region 312. In this embodiment, both the see-through display region 312 and the see-through dimming panel 406 are within a first portion of a FOV of a user wearing the head mounted display device 302, and the see-through dimming panel 403 is within a second portion of the FOV of a user wearing the device. Preferably, the see-through dimming panel 406 (which covers the see-through display region 312) and the see-through dimming panel 403 collectively cover substantially the entire FOV of a user wearing the head mounted display device 302.

The see-through display region 312 has an associated transmittance (Tr1), and the overlapping see-through dimming panel 406 has its own associated transmittance (Tr2). As mentioned above, where light travels through two different elements, each having their own transmittance, the collective transmittance of the two elements is equal to a product of the two transmittances multiplied. Accordingly, the collective transmittance of see-through dimming panel 406 and the see-through display region 312 is equal to the product of the transmittance of the see-through dimming panel 406 (Tr1) multiplied by the transmittance (Tr2) of the see-through display region 312 (e.g., equal to Tr1×Tr2). The see-through dimming panel 302 also has its own transmittance (Tr3). In accordance with an embodiment, a transmittance (Tr3) of the see-through dimming panel 302 is substantially the equal to the product of the transmittance of the see-through dimming panel 406 (Tr1) multiplied by the transmittance (Tr2) of the see-through display region 312 (i.e., Tr3≈Tr1×Tr2). Beneficially, this prevents some of the user's FOV from being darker than others. Explained another way, this provides for a substantially consistent brightness across the user's entire FOV.

In accordance with an embodiment, the see-through display region 312 has a transmittance that changes. In a similar manner as was discussed above with reference to FIGS. 4A and 4B, the transmittance (and/or other optical characteristics) of the see-through display region 312 may change, e.g., in response to user inputs, in response to signals from the control circuitry 336 and/or in response to signals from the light sensor 308, but is not limited thereto.

Where the see-through display region 312 has a transmittance that changes, at least one of the see-through dimming panels 403 and 406 should also have a transmittance that changes so that the transmittance (Tr3) of the see-through dimming panel 403 can remain substantially the equal to the product of the transmittance of the see-through dimming panel 406 (Tr1) multiplied by the transmittance (Tr2) of the see-through display region 312 (i.e., Tr3≈Tr1×Tr2). In certain embodiments, both see-through dimming panels 403 and 406 have transmittances that change. The see-through dimming panel 403 can be implemented using a first one of the dimming panels 102 described above with reference to FIGS. 1A-2B, and the see-through dimming panel 406 can be implemented using a second one of the dimming panels 102 described above with reference to FIGS. 1A-2B. Alternatively, only one of the dimming panels 403 and 406 is implemented using the dimming panel 102 described above with reference to FIGS. 1A-2B, and the other one of the dimming panels 402 and 404 is implemented using a different technology. For example, the one of the dimming panels 403 and 406 that is not implemented using the dimming panel 102, can be or include an EC layer, an LC layer, a PDLC layer, a photochromic layer, a thermochromic layer, or a MEMS micro-blinds layer. In another embodiment, only one of the see-through dimming panels 403 and 406 have a transmittance that changes, while the other has a transmittance that is static.

In an embodiment, the control circuitry 336 can control at least one of the changeable transmittances to maintain the relationship that the transmittance (Tr3) of the see-through dimming panel 403 is substantially equal to the product of the transmittance of the see-through dimming panel 406 (Tr1) multiplied by the transmittance (Tr2) of the see-through display region 312.

Where the optical characteristics (e.g., transmittance) of one or more of the see-through display region 312, the see-through dimming panel 406 and/or the see-through dimming panel 403 can be changed, then signals produced by one or more of the light sensors 308, 313 and/or 316, shown in FIG. 3, can be used by the control circuitry 336 and/or the processing unit 304 to adjust such optical characteristics (e.g., transmittance(s)). For example, the light sensor 308 can detect ambient visible light that is incident on the sensor 308 and in response thereby can produce one or more signals indicative of one or more characteristics (e.g., intensity) of the detected ambient visible light. The one or more signals produced by the light sensor 308 can be provide to the control circuitry 336 and/or the processing unit 304, at least one of which can adjust the transmittance of the see-through display region 312, the see-through dimming panel 406 and/or the see-through dimming panel 403. Such an embodiment can be used, e.g., to maintain a substantially constant brightness for the user as ambient light levels change, while maintaining a substantially uniform brightness across substantially the entire FOV of the user.

In addition to, or instead of, using the light sensor 308 to detect characteristics of ambient light that is incident on an outer portion of the display device 403, the light sensor 313 can be used to detect characteristics (e.g., intensity) of light that has traveled through both the see-through dimming panel 406 and the see-through display region 312, and the light sensor 316 can be used to detect characteristics (e.g., intensity) of light that has traveled through the see-through dimming panel 403. Each of the light sensors 313 and 316 can produce one or more signals indicative of one or more characteristics (e.g., intensity) of the light detected by the sensor. Such signals produced by the light sensors 313 and 316 can be provided to the control circuitry 336 and/or the processing unit 304, at least one of which can adjust the transmittance (and/or other optical characteristics) of the see-through dimming panel 403, the see-through dimming panel 406 and/or the see-through display region 312 to achieve substantially uniform optical characteristics (e.g., a substantially uniform transmittance) across substantially the entire FOV of a user wearing the head mounted display device 302. The positions of light sensors 313 and 316 can be different than shown in the FIG. It is also possible that multiple spatially separated light sensors 313 can be used to detect characteristics (e.g., intensity) of light that has traveled both the see-through dimming panel 406 and the see-through display region 312, and that multiple spatially separated light sensors 316 can be used to detect characteristics (e.g., intensity) of light that has traveled through the see-through dimming panel 403.

In accordance with certain embodiments, the see-through dimming panel 406 can be used to control the STCR associated with the portion of the device 302 that includes the see-through display region 312, e.g., to allow a user to adjust the STCR, or to maintain a substantially constant STCR. In these embodiments, for the portion of the device 302 that includes the see-through display region 312, STCR refers to the ratio of the total brightness of visible light emanating from the viewing side of the of the device 302 (which includes visible light emitted by the see-through display region 312 plus ambient visible light that passes through both the dimming panel 406 and the see-through display region 312) over the brightness of the ambient visible light emanating from the viewing side of the of the device 302 (which includes the brightness of the ambient visible light that passes through both the dimming panel 406 and the see-through display region 312). The STCR can be determined, e.g., based on signals received from one or more of the light sensors described herein, the transmittance of the see-through dimming panel 406 and/or the transmittance of see-through display region 312. Signals received from one or more of the light sensors described herein can be used in a closed loop feedback system to maintain a substantially constant STCR, which as mentioned above, can be a default STCR level, an STCR level specified by a user using a user interface, or an STCR level specified by an application that the device 302 executes.

Figure 4D:
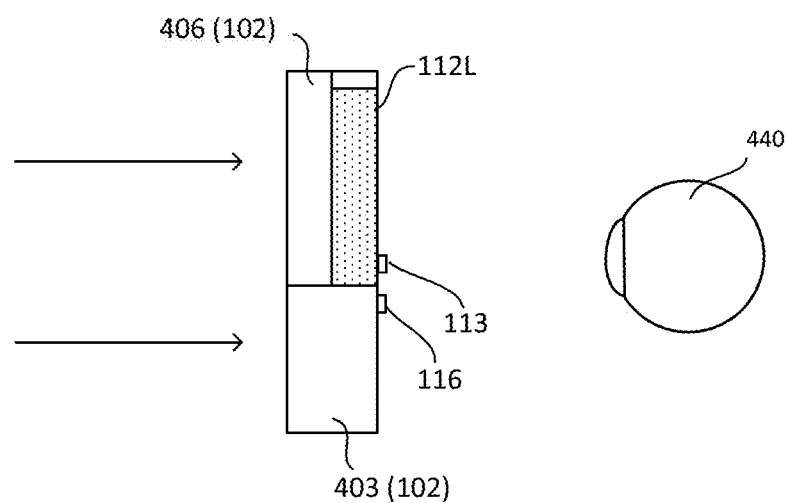
FIG. 4D is a cross-section of the components shown in FIG. 4C along line D-D in FIG. 4C.

In FIG. 4D, the see-through dimming panel 406 is shown as being in a plane that is further from a user's eyes 440 than a plane that includes the see-through display region 312. In an alternative embodiment, the see-through dimming panel 406 and the see-through display region 312 can be swapped such that the see-through dimming panel 406 is closer to the user's eyes 440 than a plane that includes the see-through display region 312. Either way, the see-through dimming panel 406 can be said to overlap both the see-through display region 312.

Optical characteristics, such as transmittance, spectral profile and color shift, are not necessarily constant over the entire visible light spectrum, wherein the visible light spectrum is typically considered to include wavelengths from about 390 nm to 700 nm. For example, a see-through dimming panel may have a 68 percent transmittance for portions of ambient visible light having a 600 nm wavelength, while the same see-through dimming panel may have a 72 percent transmittance for portions of ambient visible light having a 650 nm wavelength. Nevertheless, a further see-through dimming panel can have substantially the same transmittance of the exemplary see-through dimming panel just described if both dimming panels have substantially the same transmittance verses wavelength curves. In general, optical characteristics (such as transmittance, spectral profile and color shift) can be controlled using the various dimming panels described herein.

One or more of the see-through display region 312, the see-through peripheral dimming panel 402, the see-through dimming panel 404, the see-through dimming panel 403 and/or the see-through dimming panel 406 can make up parts of eye glass lenses or can be attached to parts of eye glass lenses, wherein such eye glass lenses can be made to any prescription (including no prescription).

Where optical characteristics (e.g., transmittance) of more than one of the above described see-through components (e.g., 312, 402, 404, 403, 406) are being dynamically changed, changes to the optical characteristics (e.g., transmittances) are preferably synchronized to thereby provide for a collectively controlled and synchronized light control system. For example, multiple passive tinting films can be used to create a uniform see-through light distribution, and multiple active dimming panels can be used to allow for synchronized, collective control of see-through light brightness level across substantially the entire FOV of the user. As can be appreciated from the above discussion, this synchronization may involve electronic control of the active optical components, including the active dimming panels, by the control circuitry 336 and/or processing unit 304. Since different types of active optical components may have different response characteristics (e.g., different response times to changes in applied voltages), such response characteristics should be understood so that changes to multiple active optical components can be performed in a synchronized manner.

During or after the assembly of one of the aforementioned embodiments of the head mounted display device 302, calibration and characterization of the resulting collective optical and electro-optical system can be performed. For example, a photometric measurement of controlled light rays through various optical elements (each of which may involve multiple points) can be performed to determine a default optical state of the system, to ensure appropriate selection of optical elements to create a uniform distribution of light intensity (and possibly other optical characteristics as desired) across substantially the entire field of view of a user. In addition to selection of optical elements, tuning may be done by electronic control of the active electro-optical elements, including active dimming panels. Active/dynamic control calibration and characterization can be done by performing time-varied photometric measurements and monitoring of electronic control signals, and performing tuning as required. Such calibration and characterization techniques can be used to ensure that optical properties and transitions are consistent across many optics in an optical path. Similar calibration and characterization can be performed for the dimming panel 102 where it is used in a non-head mounted display application.

Figure 6:
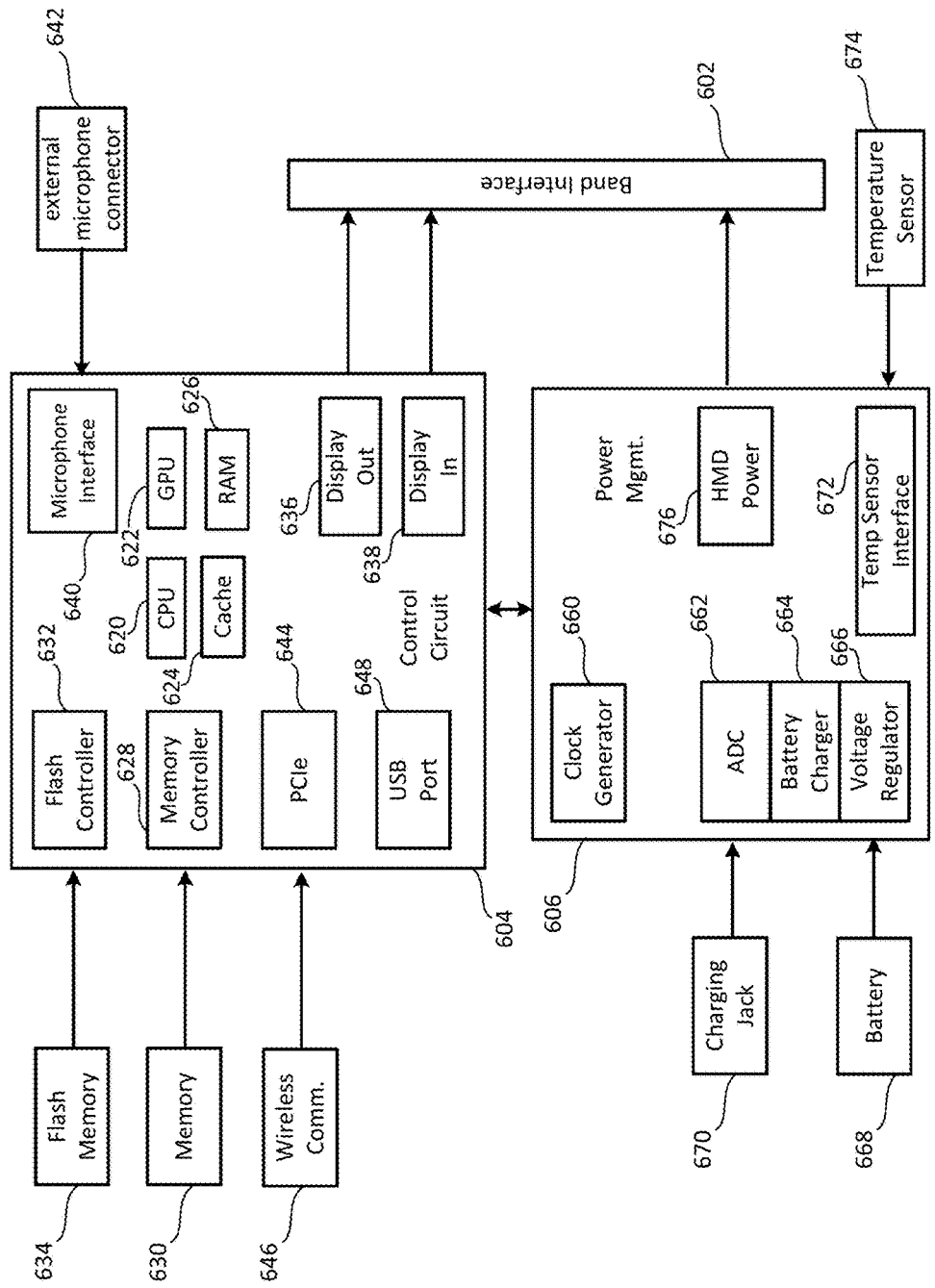
FIG. 6 is a block diagram of one embodiment of hardware and software components a processing unit as may be used with one or more embodiments.

FIG. 5 is a block diagram of one embodiment of hardware and software components of the see-through, near-eye, mixed reality head mounted display device 302 introduced in FIG. 3. FIG. 6 is a block diagram of one embodiment of hardware and software components of the processing unit 304 introduced in FIG. 3. In an embodiment, the head mounted display device 302 receives instructions about a virtual image from the processing unit 304 and provides data from sensors back to the processing unit 304. Software and hardware components that may be embodied in the processing unit 304, for example as depicted in FIG. 6, receive the sensory data from the head mounted display device 302 and may also receive sensory information from the computing system 352 over the network 350. Based on that information, the processing unit 304 can determine where and when to provide a virtual image to the user and send instructions accordingly to the control circuitry 336 of the head mounted display device 302.

Note that some of the components of FIG. 5 are shown in shadow to indicate that there can be at least two of each of those components, e.g., at least one for the left side and at least one for the right side of head mounted display device 302. FIG. 5 shows a control circuit 500 in communication with a power management circuit 502. The control circuit 500 includes a processor 510, memory controller 512 in communication with memory 544 (e.g., D-RAM), a camera interface 516, a camera buffer 518, a display driver 517, a display formatter 522, an optical characteristics controller 523, a timing generator 526, a display out interface 528, and a display in interface 530. In one embodiment, all of the components of the control circuit 500 are in communication with each other via dedicated lines of one or more buses, or using a shared bus. In another embodiment, each of the components of the control circuit 500 is in communication with the processor 510.

The camera interface 516 provides an interface to the one or two outwardly facing cameras 109, and in an embodiment, an IR camera as sensor 534B and stores respective images received from the cameras 309, 534B in the camera buffer 518. The display driver 517 can drive a micro-display device or a see-through micro-display 520. Display formatter 522 may provide information, about the virtual image being displayed on micro-display device or see-through micro-display 520 to one or more processors of one or more computer systems, e.g. 304 and/or 352 performing processing for the mixed reality system. Timing generator 526 is used to provide timing data for the system. Display out interface 528 includes a buffer for providing images from outwardly facing camera(s) 309 and the eye tracking cameras 534B to the processing unit 304. Display in interface 530 includes a buffer for receiving images such as a virtual image to be displayed on the micro-display device or see-through micro-display 520, or more generally, in the see-through display region 312. The display out 528 and the display in 530 communicate with the band interface 532, which is an interface to the processing unit 304.

The optical characteristics controller 523 controls the optical characteristics (e.g., transmittance and/or spectral profile, but not limited thereto) of the various dimming panels (e.g., 402, 404, 403 and/or 406) of the head mounted display device 302. The optical characteristics controller 523 can also control the optical characteristics of the see-through display region 312. A user interface 543 can accept inputs from a user to enable the user to adjust the transmittance (and/or other optical characteristics) of the see-through display region 312 and/or the various dimming panels described herein. More generally, the user interface 543 enables a user to adjust optical characteristics of the see-through portions of the head mounted display device 302. To allow for such adjustments, the user interface 543 can include one or more buttons, sliders or some other tactile user interfaces located on the frame 315 of the head mounted display device 302. Alternatively, the user interface 543 can be provided by a mobile computing device (e.g., a smartphone or tablet) or the processing unit 304 that communicates with the head mounted display device 302. The optical characteristics controller 523 and/or the user interface 543 can also be used to control the STCR.

The power management circuit 502 includes a voltage regulator 534, an eye tracking illumination driver 536, an audio DAC and amplifier 538, a microphone preamplifier and audio ADC 540, a temperature sensor interface 542, an active filter controller 537, and a clock generator 545. The voltage regulator 534 receives power from the processing unit 304 via the band interface 532 and provides that power to the other components of the head mounted display device 302. The illumination driver 536 controls, for example via a drive current or voltage, the eye tracking illumination unit 534A to operate about a predetermined wavelength or within a wavelength range. The audio DAC and amplifier 538 provides audio data to the earphones 530. The microphone preamplifier and audio ADC 540 provides an interface for the microphone 310. The temperature sensor interface 542 is an interface for the temperature sensor 531. The active filter controller 537 receives data indicating one or more wavelengths for which each wavelength selective filter 527 is to act as a selective wavelength filter. The power management unit 502 also provides power and receives data back from the three axis magnetometer 532A, three axis gyroscope 532B and three axis accelerometer 532C. The power management unit 502 also provides power and receives data back from and sends data to the GPS transceiver 544. The power management unit 502 can also include and/or control the voltage supplies 122, 124 described above with reference to FIG. 1C.

FIG. 6 is a block diagram of one embodiment of the hardware and software components of the processing unit 304 associated with the see-through, near-eye, mixed reality head mounted display device 302. FIG. 6 shows a control circuit 604 in communication with a power management circuit 606. The control circuit 604 includes a central processing unit (CPU) 620, a graphics processing unit (GPU) 622, a cache 624, RAM 626, a memory control 628 in communication with memory 630 (e.g., D-RAM), a flash memory controller 632 in communication with flash memory 634 (or other type of non-volatile storage), a display out buffer 636 in communication with the see-through, near-eye head mounted display device 302 via a band interface 602 and the band interface 532, a display in buffer 638 in communication with the near-eye head mounted display device 302 via the band interface 602 and the band interface 532, a microphone interface 640 in communication with an external microphone connector 642 for connecting to a microphone, a PCI express interface for connecting to a wireless communication device 646, and USB port(s) 648.

In one embodiment, the wireless communication component 646 can include a WiFi enabled communication device, Bluetooth communication device, infrared communication device, cellular, 3G, 4G communication devices, wireless USB (WUSB) communication device, RFID communication device etc. The wireless communication component 646 thus allows peer-to-peer data transfers with for example, another display device system 300, as well as connection to a larger network via a wireless router or cell tower. The USB port can be used to dock the processing unit 304 to another display device system 300. Additionally, the processing unit 304 can dock to another computing system 352 in order to load data or software onto the processing unit 304 as well as charge the processing unit 304. In one embodiment, the CPU 620 and the GPU 622 are the main workhorses for determining where, when and how to insert virtual images into the view of the user, and more specifically, into the see-through display region 312.

The power management circuit 606 includes a clock generator 660, an analog-to-digital converter (ADC) 662, a battery charger 664, a voltage regulator 666, a head mounted display (HMD) power source 676, and a temperature sensor interface 672 in communication with a temperature sensor 674 (e.g., located on a wrist band for the processing unit 304). The ADC 662 is connected to a charging jack 670 for receiving an AC supply and creating a DC supply for the system. The voltage regulator 666 is in communication with a battery 668 for supplying power to the system. The battery charger 664 is used to charge the battery 668 (via the voltage regulator 666) upon receiving power from the charging jack 670. In an embodiment, the HMD power source 676 provides power to the head mounted display device 302.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the present technology. For example, it would be possible to combine or separate some of the steps shown in FIGS. 2A and 2B. For another example, it is possible to change the boundaries of some of the blocks shown in FIGS. 5 and 6.

While certain embodiments described above where described as being directed to, or for use with, a see-through, near-eye mixed reality head mounted display device, many of the embodiments described above can be used with other types of see-through display devices that are not head mounted types of display devices. In other words, embodiments of the present technology are also directed to other types of see-through displays (and method for use therewith) that include at least one dimming panel that enables optical characteristics, such as transmittance, to be adjusted in response to an input from a user and/or based on closed-loop feedback from one or more light sensor(s). Additionally, or alternatively, embodiments described herein can be used to adjust the see-through contrast ratio (STCR) of the see-through display regions of such other see-though displays, e.g., based on user inputs and/or closed loop feedback. For example, a user interface can enable a user to adjust the brightness of a see-through display region, the transmittance of a dimming panel and/or the STCR associated with the portion of a see-through display device including the see-through display region. Additionally, or alternatively, a controller can adjust the brightness of the see-through display region and/or the transmittance of a dimming panel (that covers the see-through display region) to maintain a substantially constant STCR associated with the portion of the device including the see-through display region.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A see-through dimming panel, comprising:
   a first transparent substrate layer;
   a second transparent substrate layer;
   a suspended-particle-device (SPD) layer between the first and second transparent substrate layers;
   a first transparent conductor layer between the first transparent substrate layer and the SPD layer;
   a second transparent conductor layer between the second transparent substrate layer and the SPD layer;
   a first electrode electrically coupled to the first transparent conductor layer;
   a second electrode electrically coupled to a first end of the second transparent conductor layer; and a third electrode electrically coupled to a second end of the second transparent conductor layer opposite the first end;

wherein an electric potential difference applied between the first and second electrodes controls a transmittance level of the SPD layer; and wherein an electric potential difference applied between the second and third electrodes controls a speed at which the transmittance level of the SPD layer decreases when the electric potential difference applied between the first and second electrodes is decreased.

2. The see-through dimming panel of claim 1, further comprising circuitry to control the electric potential difference between the first and second electrodes, and the electric potential difference between the second and third electrodes, wherein the circuitry at least one of controls or includes one or more voltage supplies.

3. The see-through dimming panel of claim 2, wherein the circuitry comprises:
   a first voltage supply that applies the electric potential difference between the first and second electrodes; and
   a second voltage supply that applies the electric potential difference between the second and third electrodes.

4. The see-through dimming panel of claim 2, wherein the circuitry is configured to:
   adjust the electric potential difference between the first and second electrodes in order to adjust the transmittance of the SPD layer; and
   adjust the electric potential difference between the second and third electrodes in order to adjust a rate at which the transmittance of the SPD layer is adjusted.

5. The see-through dimming panel of claim 2, wherein the circuitry is configured to:
   increase the electric potential difference between the first and second electrodes to increase the transmittance of the SPD layer;
   decrease the electric potential difference between the first and second electrodes to decrease the transmittance of the SPD layer; and
   increase the electric potential difference between the second and third electrodes to increase a rate at which the transmittance of the SPD layer is decreased when the electric potential difference between the first and second electrodes is decreased.

6. The see-through dimming panel of claim 5, wherein the circuitry is also configured to:
   decrease the electric potential difference between the first and second ends of the second transparent conductor layer to decrease a rate at which the transmittance of the SPD layer is decreased.

7. The see-through dimming panel of claim 1, wherein:
   application of the electric potential difference between the first and second electrodes produces a longitudinal electric field that causes suspended particles in the SPD layer to align; and
   application of the electric potential difference between the second and third electrodes produces a transverse electric field that causes microscopic heating of the SPD layer, which increases a temperature of the SPD layer.

8. The see-through dimming panel of claim 1, further comprising:
   one or more light sensors that detect ambient visible light that is incident on the optical sensor(s) and produce one or more signals indicative of an intensity of the detected ambient visible light; and
   a controller that adjusts at least one of the electric potential difference applied between the first and second electrodes, and the electric potential difference applied between the second and third electrodes, in dependence on at least one of the signals produced by at least one of the one or more light sensors.

9. The see-through dimming panel of claim 8, wherein the controller adjusts the electric potential difference applied between the first and second electrodes, and the electric potential difference applied between the second and third electrodes, in order to maintain an intensity level of the ambient light that travels through the see-through dimming panel substantially equal to a specified intensity level.

10. The see-through dimming panel of claim 9, further comprising:
    a user interface that enables a user to specify the specified intensity level.

11. The see-through dimming panel of claim 1, wherein the see-through dimming panel is included in one of the following:
    a see-through, near-eye mixed reality head mounted display (HMD) device;
    a see-through non-HMD display device; or
    a dimmable window.

12. A see-through, near-eye mixed reality head mounted display device, comprising:
    a see-through display region within a field-of-view (FOV) of a user wearing the device;
    a see-through dimming panel overlapping the see-through display region;
    wherein one or more virtual images are displayable within the see-through display region; and
    wherein the see-through dimming panel includes
      a first transparent conductor layer;
      a second transparent conductor layer;
      a suspended-particle-device (SPD) layer between the first and second transparent conductor layers;
      a first electrode electrically coupled to the first transparent conductor layer;
      a second electrode electrically coupled to a first end of the second transparent conductor;
      a third electrode electrically coupled to a second end of the second transparent conductor; and
      circuitry configured to control the electric potential difference between the first and second electrodes, and the electric potential difference between the second and third electrodes, in order to adjust a transmittance of the see-through dimming panel;
    wherein the electric potential difference applied by the circuitry between the first and second electrodes controls a level of the transmittance of the see-through dimming panel; and
    wherein the electric potential difference applied by the circuitry between the second and third electrodes controls a speed at which the level of transmittance of the see-through dimming panel decreases when the electric potential difference applied between the first and second electrodes is decreased by the circuitry.

13. The device of claim 12, wherein at least one of a brightness of the see-through display region or the transmittance the see-through dimming panel is adjustable to thereby adjust a see-through contrast ratio (STCR) associated with a portion of the device including the see-through display region.

14. The device of claim 13, further comprising a user interface that enables a user to adjust at least one of
    the brightness of the see-through display region,
    the transmittance of the see-through dimming panel, or the STCR associated with the portion of the device including the see-through display region.

15. The device of claim 13, further comprising:
a controller that adjusts at least one of a brightness of the see-through display region or the transmittance of the see-through dimming panel to maintain a substantially constant see-through contrast ratio (STCR) associated with the portion of the device including the see-through display region.

16. A method for use with a suspended-particle-device (SPD) layer sandwiched between a first transparent conductor layer and a second transparent conductor layer, the method comprising:
adjusting an electric potential difference between the first and second transparent conductor layers in order to adjust a transmittance of the SPD layer; and
adjusting an electric potential difference between first and second opposing ends of the second transparent conductor layer in order to adjust a rate at which the transmittance of the SPD layer is adjusted when the electric potential difference applied between the first and second transparent conductor layers is decreased.

17. The method of claim 16, wherein the adjusting the electric potential difference between the first and second transparent conductor layers comprises:
increasing the electric potential difference between the first and second transparent conductor layers to increase the transmittance of the SPD layer; and
decreasing the electric potential difference between the first and second transparent conductor layers to decrease the transmittance of the SPD layer.

18. The method of claim 17, wherein the adjusting an electric potential difference between the first and second opposing ends of the second transparent conductor layer comprises:
increasing the electric potential difference between the first end and second opposing ends of the second transparent conductor layer to increase the rate at which the transmittance of the SPD layer is decreased when the electric potential difference between the first and second transparent conductor layers is decreased.

19. The method of claim 18, wherein the adjusting the electric potential difference between the first and second opposing ends of the second transparent conductor layer further comprises:
decreasing the electric potential difference between the first and second opposing ends of the transparent conductor layer to decrease a rate at which the transmittance of the SPD layer is decreased.

20. The method of claim 18, wherein the increasing the electric potential difference between the first and second opposing ends of the second transparent conductor layer increases a transverse electric field that causes microscopic heating of the SPD layer, which increases a temperature of the SPD layer.

* * * * *